United States Patent [19]

Yamashita et al.

[11] Patent Number: 5,410,923
[45] Date of Patent: May 2, 1995

[54] SHIFT CONTROL SYSTEM FOR A VEHICLE TRANSMISSION HAVING A BACKWARD/FORWARD DRIVE CHANGEOVER DEVICE AND A STEPLESS CHANGE SPEED DEVICE

[75] Inventors: Nobuyuki Yamashita; Ryozo Imanishi; Katsuhiko Uemura, all of Sakai, Japan

[73] Assignee: Kubota Corporation, Japan

[21] Appl. No.: 117,908

[22] Filed: Sep. 7, 1993

[30] Foreign Application Priority Data

Aug. 9, 1992 [JP] Japan .................. 4-239454

[51] Int. Cl.⁶ .................. B60K 41/22; F16H 63/36; G05G 1/14
[52] U.S. Cl. .................. 74/474; 74/481; 74/483 K; 192/3.63; 474/38; 477/112
[58] Field of Search .......... 74/474, 481, 482, 483 K; 474/37, 38; 477/112; 192/3.63

[56] References Cited

U.S. PATENT DOCUMENTS

| | | | |
|---|---|---|---|
| 1,715,595 | 6/1929 | Gouldbourn | 474/37 X |
| 3,317,012 | 5/1967 | Heidner et al. | 477/112 |
| 4,040,306 | 8/1977 | Jensen | 74/481 |
| 4,128,017 | 12/1978 | Clarke | 474/38 |
| 4,346,617 | 8/1982 | Schroeder et al. | 74/481 |

FOREIGN PATENT DOCUMENTS

| | | |
|---|---|---|
| 2010734 | 9/1990 | Canada . |
| 2-209651 | 8/1990 | Japan . |
| 1497770 | 1/1978 | United Kingdom . |

*Primary Examiner*—Allan D. Herrmann
*Attorney, Agent, or Firm*—Webb Ziesenheim Bruening Logsdon Orkin & Hanson

[57] ABSTRACT

A shift adjusting device includes a cam plate and an arm. The cam plate is pivotable and operatively connected to a change speed interlocking mechanism extending between a shift pedal and a belt type stepless change speed device. The arm is also pivotable and operatively connected to a changeover interlocking mechanism extending between a switch lever and a backward/forward drive changeover device. The arm has a pin for engaging a control slot formed in the cam plate. The control slot includes an arcuate forward drive slot portion and an arcuate backward drive slot portion. When the switch lever is in a forward drive position, the pin lies in the forward drive slot portion. The forward drive slot portion allows a full stroke depression of the shift pedal, whereby a forward speed may be selected between minimum speed and maximum speed. When the switch lever is in a backward drive position, the pin lies in the backward drive slot portion. The backward drive slot portion allows only a half stroke depression of the shift pedal, whereby a backward speed may be selected between minimum speed and half the maximum speed.

8 Claims, 11 Drawing Sheets

SHIFT CONTROL SYSTEM FOR A VEHICLE TRANSMISSION HAVING A BACKWARD/FORWARD DRIVE CHANGEOVER DEVICE AND A STEPLESS CHANGE SPEED DEVICE

BACKGROUND OF THE INVENTION

1. Field of the Invention

The present invention relates to a shift control system for a transmission mounted on a working vehicle such as a lawn mower or lawn tractor and having a backward/forward drive changeover device and a stepless change speed device.

2. Description of the Related Art

A working vehicle having such a shift control system, particularly where a friction type change speed device is used as the stepless change speed device, additionally includes a backward/forward drive changeover device since the stepless change speed device alone cannot effect a changeover between forward drive and backward drive. This type of working vehicle is disclosed in Japanese Patent Publication Kokai No. 2-209651, for example. In the working vehicle disclosed therein, running speed is increased or decreased by a friction type stepless change speed device utilizing a taper cone, and a changeover between forward drive and backward drive is effected by a backward/forward drive changeover device. The vehicle includes a shift lever and a switch lever for controlling the respective devices. po When the shift lever is operated to a maximum extent, the same maximum speed is available for backward drive as well as forward drive. However, the vehicle need not run at high speed backward, and the known shift control system is not considered to realize an optimal control.

SUMMARY OF THE INVENTION

The object of the present invention is to eliminate the drawback of the prior an noted above and provide an optimal shift control system for a vehicle transmission having a backward/forward drive changeover device and a stepless change speed device.

The above object is fulfilled, according to the present invention, by a shift control system comprising a shifting device for controlling a change speed device, a first interlocking line for transmitting a shift from the shifting device to the change speed device, a shift adjusting device mounted in the first interlocking line for adjusting the shift transmitted from the shifting device to the change speed device, a switching device for controlling a backward/forward drive changeover device, and a second interlocking line for transmitting a shift of the switching device as an amount of control to the shift adjusting device, wherein the shift adjusting device is operable, in response to a shift to a backward drive position of the switching device, to limit to a predetermined range the shift transmitted from the shifting device to the change speed device.

The shift control system having the above construction automatically sets a limit to a maximum backward speed, thereby to preclude a high speed condition possible in time of forward running of the vehicle. This shift control system is an optimal system with a high speed backward running condition excluded from its change speed range as unnecessary.

In a preferred embodiment of the invention, the shift adjusting device is operable to transmit a shift corresponding to a minimum speed to the change speed device when the switching device is in neutral. Considering a matter of general practice that a changeover between forward drive and backward drive is effected through a neutral position, this embodiment produces a desirable shifting operation in that the changeover between forward drive and backward drive is effected only when the stepless change speed device is in a minimum speed condition.

Other features and advantages of the present invention will be apparent from the following description of the preferred embodiment to be taken in conjunction with the drawings.

DESCRIPTION OF THE PREFERRED EMBODIMENT

An example of shift control system according to the present invention as applied to a mid-mount type riding lawn mower will be described hereinafter with reference to the drawings.

Figure 1:
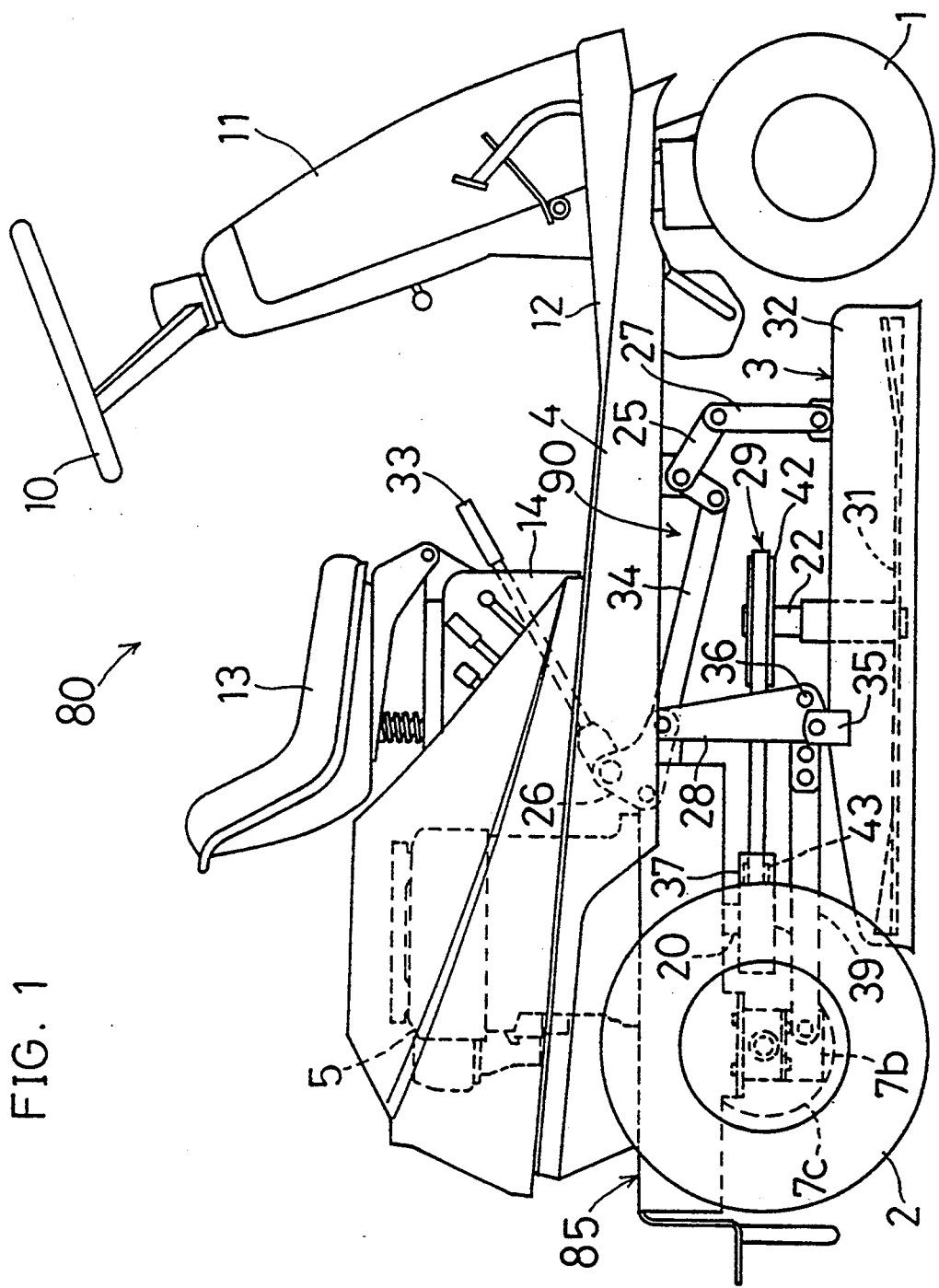
FIG. 1 is a side elevation of a lawn mower employing a shift control system according to the present invention.
Figure 2:
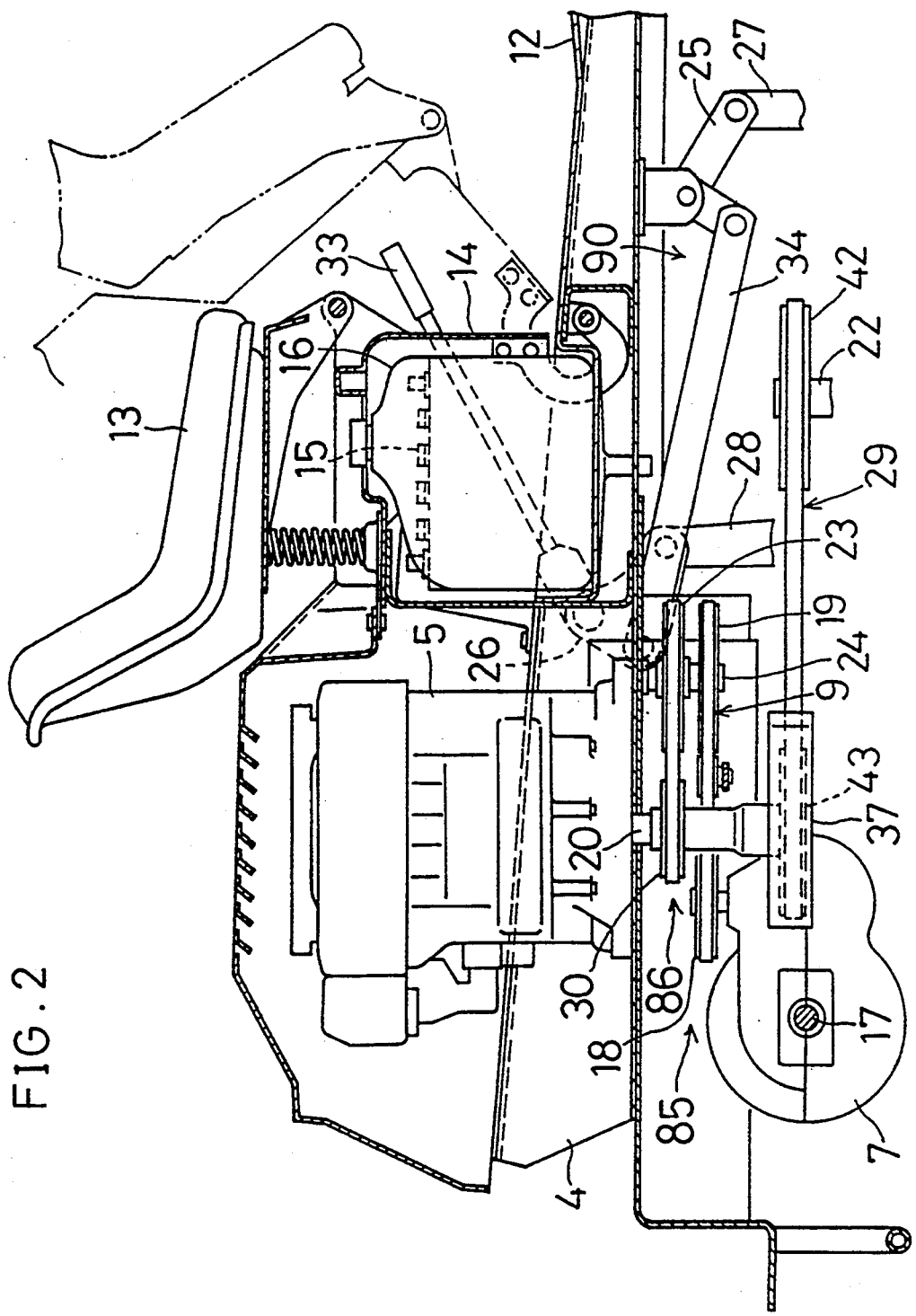
FIG. 2 is sectional side view of a rear portion of the lawn mower.
Figure 3:
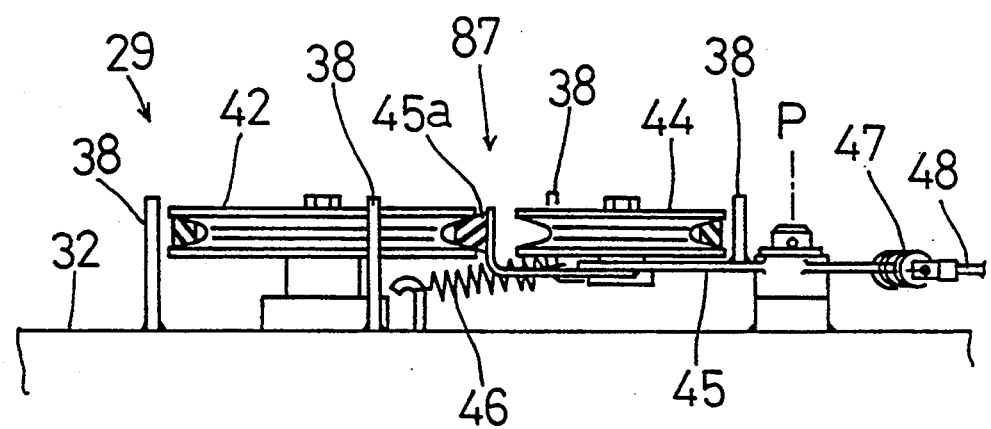
FIG. 3 is a side view of a PTO clutch/brake mechanism.
Figure 4:
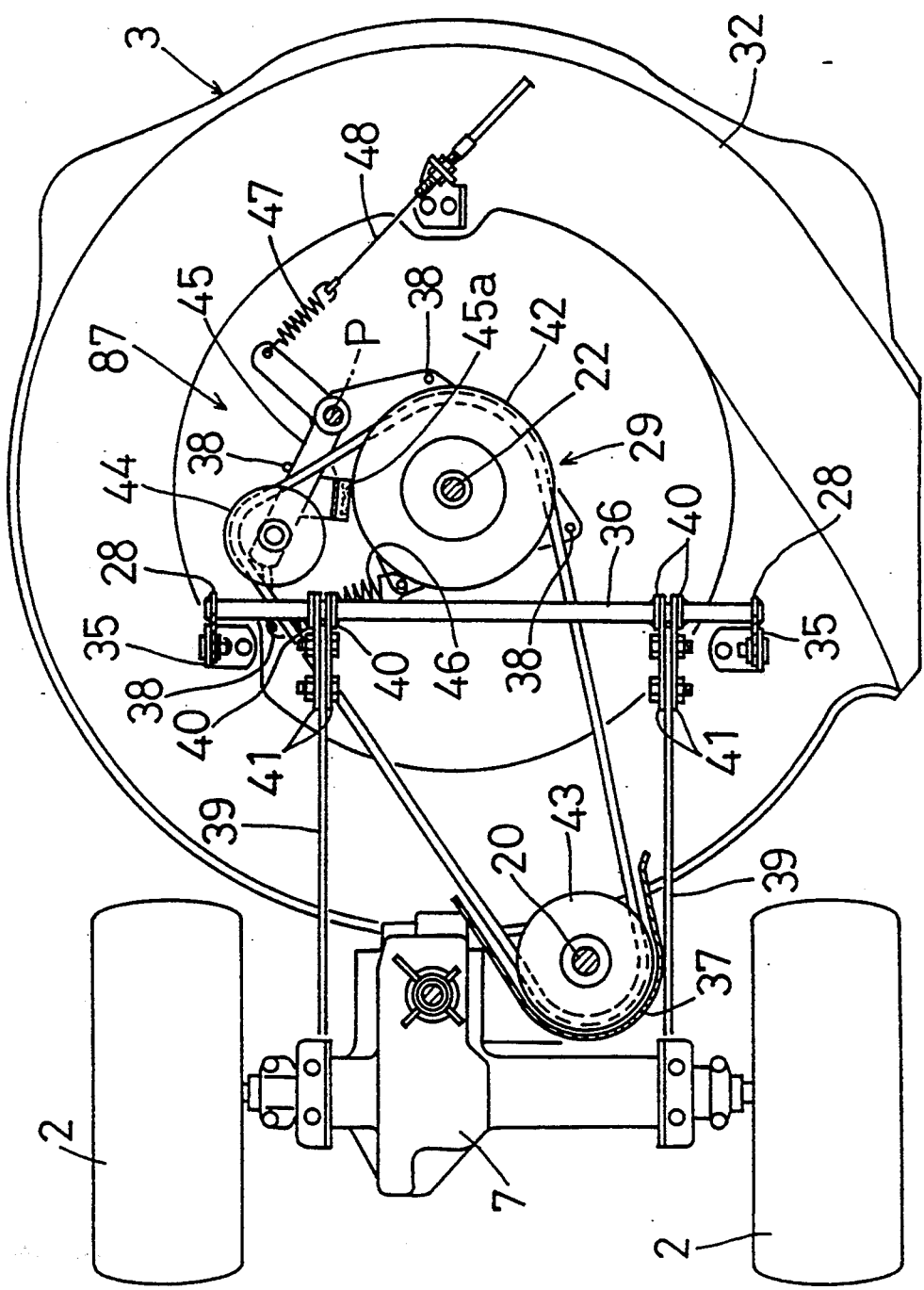
FIG. 4 is a plan view of a structure for transmitting power to a grass cutting unit.

FIG. 1 shows a side elevation of the mid-mount type riding lawn mower, and FIG. 2 shows a sectional side view of a rear portion of the lawn mower. The lawn mower includes dirigible front wheels 1, rear drive wheels 2, a vertical engine 5, a driver's section 80, a drive transmitting section 85, a grass cutting unit 3 and a body frame 4.

The driver's section 80 includes a steering column 11 having a steering wheel 10, a step floor 12, and a driver's seat 13. The driver's seat 13 is disposed immediately forwardly of the engine 5. Under the driver's seat 13 is a floor cover 14 enclosing a battery 15 and a fuel tank 16.

The drive transmitting section 85 includes a belt type stepless change speed device 86, and a transmission 7 having a backward/forward drive changeover device 95 mounted therein. The transmission 7 has rear axles 17 extending therefrom.

The grass cutting unit 3 and a power transmitting structure therefor will be described in detail next.

Referring to FIGS. 1, 2, and 3 through 6, the grass cutting unit 3 is suspended from the body frame 4 through a four-point link mechanism 90 including front and rear control links 25 and 26 and vertical front and rear rods 27 and 28. This grass cutting unit 3 is a single blade type unit having a rotary blade 31 mounted in a blade housing 32. The blade 31 is driven through a second belt interlocking mechanism 29 extending between an input blade shaft 22 and a pulley 43 attached to a lower position of a crank shaft 20.

A rear link 26 to which a raising and lowering lever 33 is attached is operatively connected to a front link 25 through a connecting link 34. The raising and lowering lever 33 is disposed at a left side of the driver's seat 13. The blade housing 32 has a round bar 36 extending transversely and rigidly attached thereto through two mounting brackets 35 fixed to opposite rear positions of the housing 32. The right and left rear rods 28 are connected to opposite ends of the round bar 36. To counteract tension of the second belt interlocking mechanism 29, a pair of right and left struts 39 extend between the round bar 36 and brackets 7b arranged at right and left sides of a transmission case 7C.

Figure 6:
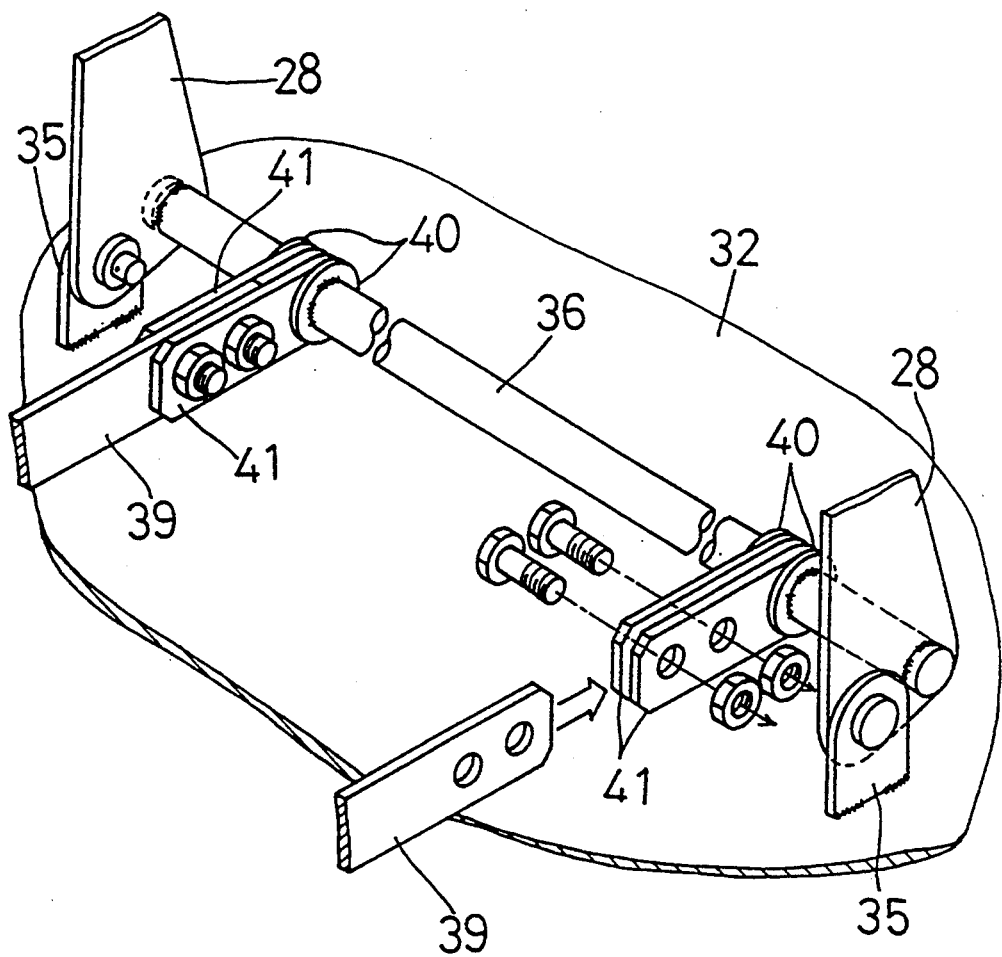
FIG. 6 is a perspective view of a structure for coupling each strut to the grass cutting unit.

Each of the struts 39 is detachably connected to the round bar 36 as shown in FIG. 6. A connecting structure for each strut 39 includes two washers 40 welded to the round bar 36, and two coupling plates 41 pivotably and irremovably attached to the round bar 36 between the washers 40. A forward end of one of the struts 39 is sandwiched between the coupling plates 41 and secured thereto by two bolts.

Figure 5:
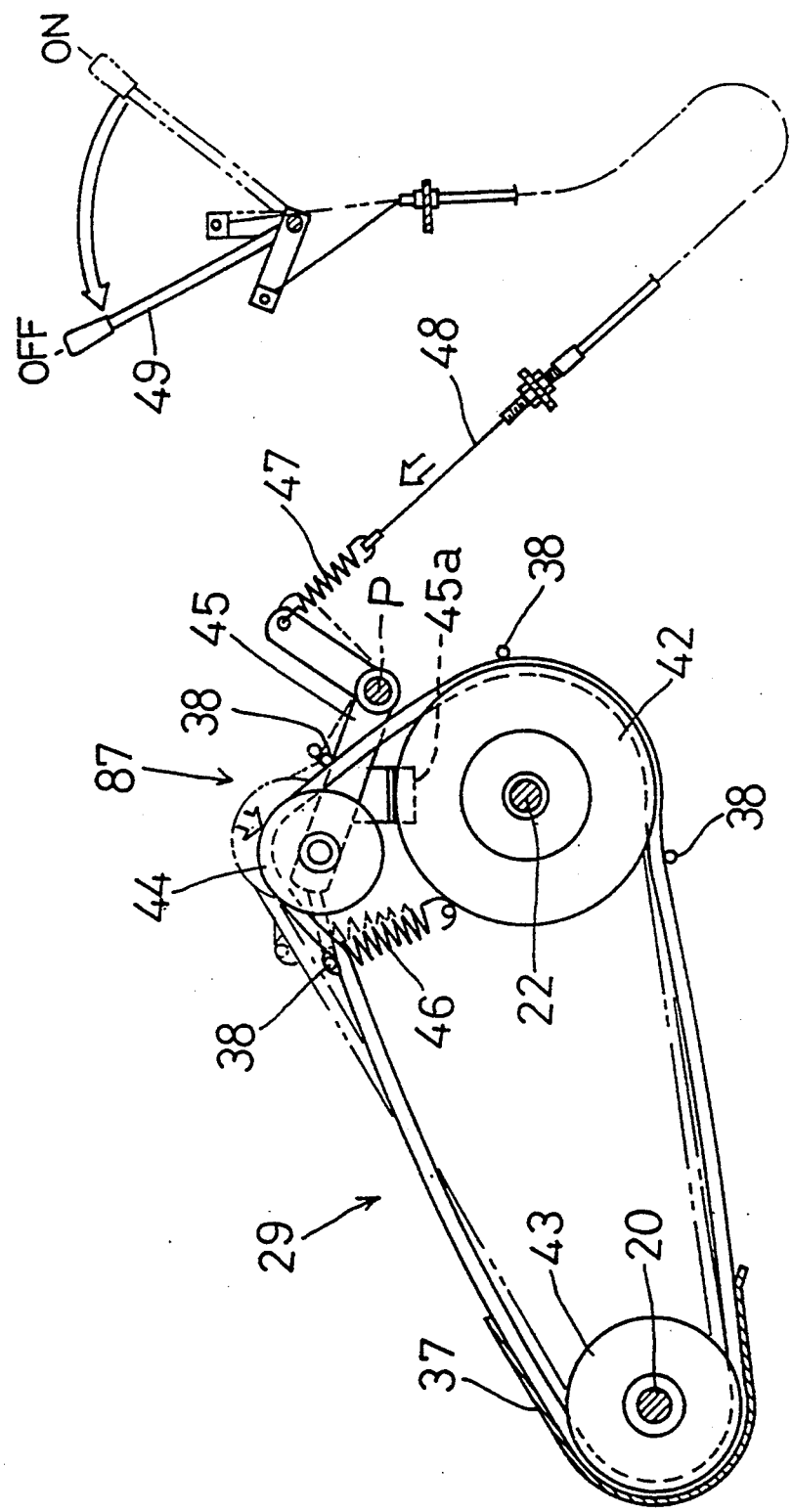
FIG. 5 is a plan view of the PTO clutch/brake mechanism.

FIG. 5 shows a PTO clutch/brake mechanism 87 utilizing a tension pulley 44 of the second belt interlocking mechanism 29. The tension pulley 44 is rotatably supported by a tension arm 45 pivotable about a vertical axis P. The tension arm 45 further supports a brake shoe 45a movable into contact with an input pulley 42. The tension arm 45 is biased toward a braking position by a brake spring 46 connected thereto. Further, a control wire 48 having a tension spring 47 is connected to the tension arm 45.

When a PTO clutch lever 49 is operated to an ON position, the control wire 48 is pulled against the biasing force of the brake spring 46. As a result, the tension spring 47 tightens the belt to place the second belt interlocking mechanism 29 acting as a blade clutch in an operative or engaged position. When the PTO clutch lever 49 is operated to an OFF position, the control wire 48 is relaxed to render the tension spring 47 inoperative. As a result, the second belt interlocking mechanism 29 assumes an inoperative or disengaged position to break power transmission. At the same time, the brake spring 46 presses the brake shoe 45a upon the input pulley 42. Thus, inertial rotation of the rotary blade 31 is stopped immediately upon disengagement of the blade clutch.

An arcuate belt presser plate 37 is provided in the region of the pulley 43 attached to the lower position of the crank shaft 20. Four belt presser bars 38 in total are arranged in the regions of the input pulley 42 and tension pulley 44.

Figure 7:
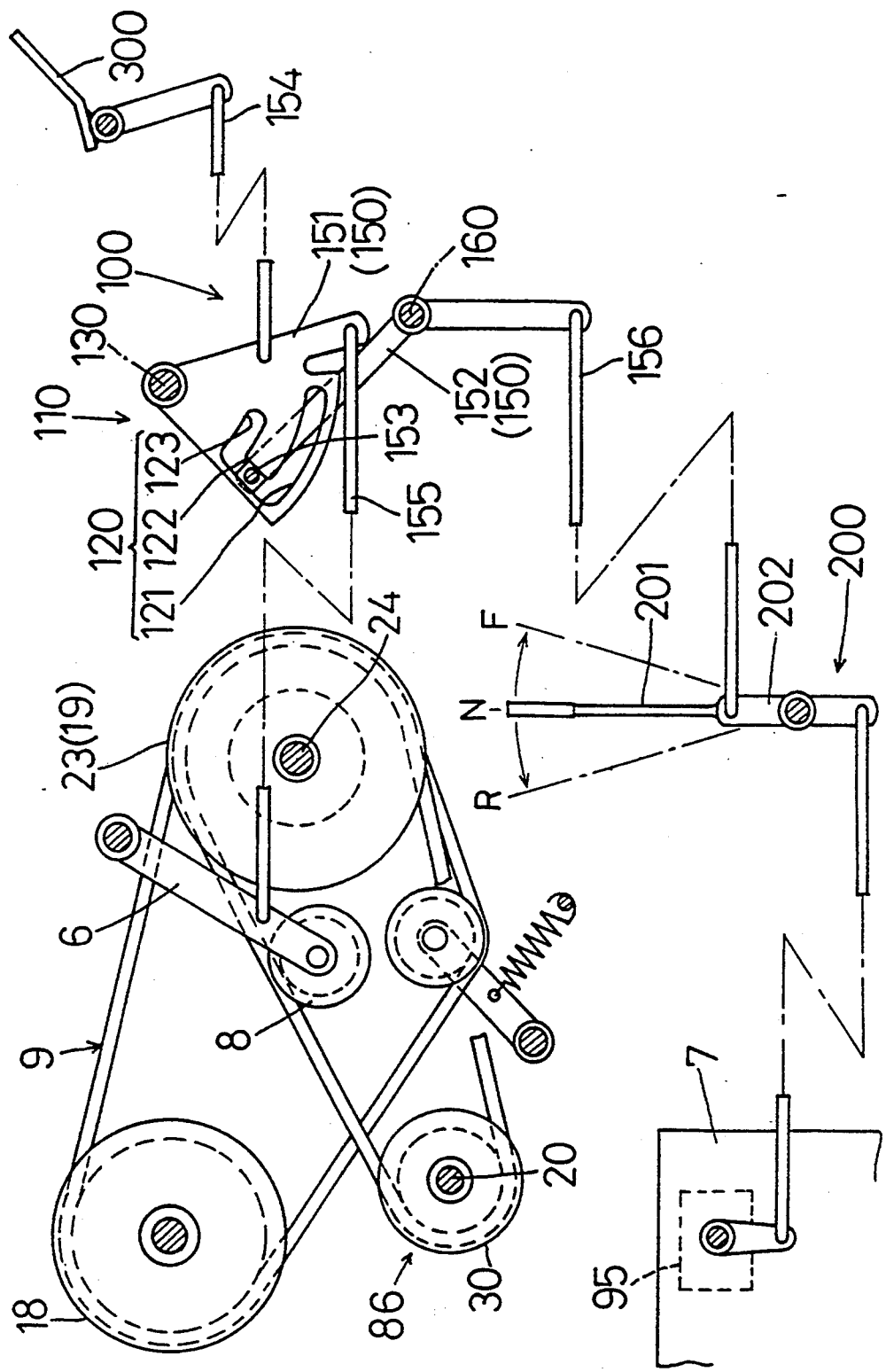
FIG. 7 is a system diagram showing a shift adjusting device in neutral position.
Figure 8:
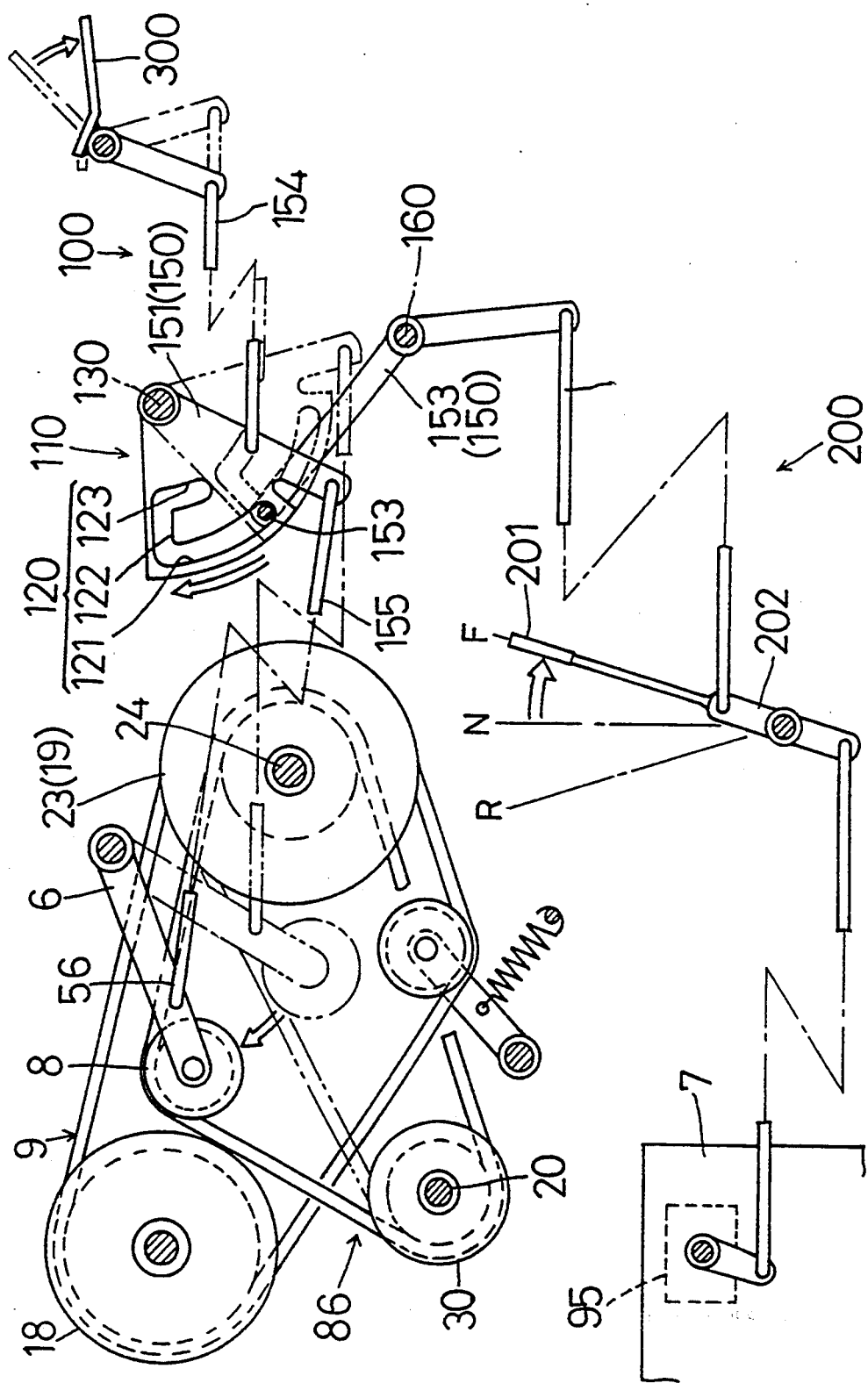
FIG. 8 is a system diagram showing the shift adjusting device in a forward drive position.
Figure 9:
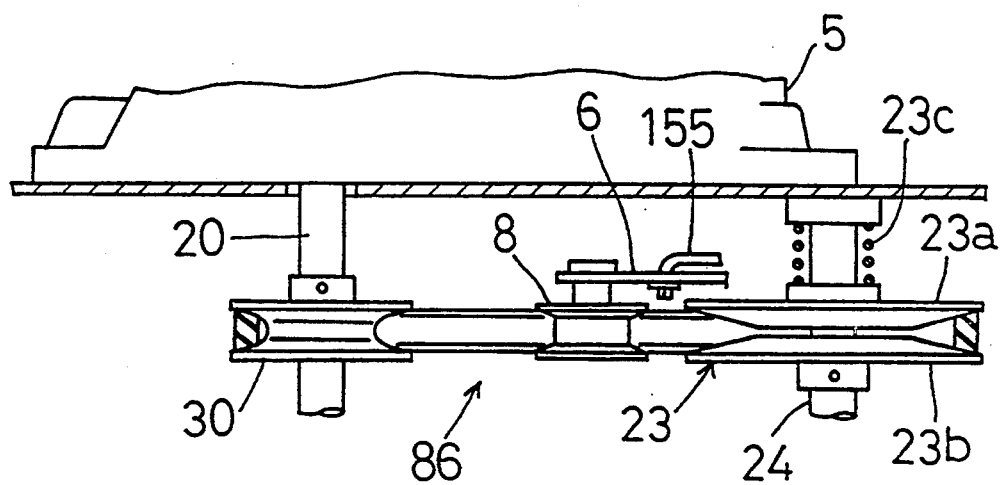
FIG. 9 is a side view of a belt type stepless change speed device.

Referring to FIGS. 7 through 9, the stepless change speed device 86 includes an upper pulley 30 mounted on the crank shaft 20 and a split pulley 23 mounted on an intermediate shaft 24. A first belt interlocking mechanism 9 includes an intermediate pulley 19 mounted on the intermediate shaft 24 and a propelling drive input pulley 18 of the transmission 7. The split pulley 23 has a movable pulley pan 23a biased toward a fixed pulley part 23b by a coil spring 23c. The stepless change speed device 86 further includes a tension pulley 8 is forcibly operable to pivot in a direction to tighten the belt for acceleration. When the tension pulley 8 is released, the coil spring 23c moves the two pulley parts 23a and 23b closer to each other for deceleration.

A change speed interlocking mechanism 100 is provided for operatively connecting a tension arm 6 of the tension pulley 8 to a shift pedal 300 disposed in the driver's section 80. A changeover interlocking mechanism 200 is provided for operatively connecting the backward/forward drive changeover device 95 to a switch lever 201 disposed in the driver's section 80. Further, a shift adjusting device 110 is provided for enabling a backward/forward drive changeover operation only when the stepless change speed device 86 is in a minimum speed condition.

The shift adjusting device 110 includes a cam mechanism 150 having a cam plate 151 pivotable about an axis 130, and an arm 152 pivotable in a seesaw-like way about an axis 160 and having an engaging pin 153 at one end thereof fitted in a control slot 120 formed in the cam plate 151. The cam plate 151 is operatively connected to the change speed interlocking mechanism 100, i.e. to a pedal rod 154 extending from the shift pedal 300 and to an arm rod 155 extending from the tension arm 6. The arm 152 is operatively connected to the changeover interlocking mechanism 200, i.e. to a changeover rod 156 connected to a lever fulcrum arm 202 pivotable with the switch lever 201. Thus, the cam plate 151 is pivotable with operation of the change speed interlocking mechanism 100, while the arm 152 is pivotable with operation of the changeover interlocking mechanism 200.

The control slot 120 has an approximately J-shaped configuration defining a forward drive slot portion 121, a backward drive slot portion 123, and a changeover slot portion 122 communicating with the other slot portions 121 and 123. The forward drive slot portion 121 allows the shift pedal 300 to be depressed to a full extent, or allows a full stroke operation of the shift pedal 300, to shift the stepless change speed device 86 from minimum speed to maximum speed when the backward/forward drive changeover device 95 is in a forward drive condition. The backward drive slot portion 123 allows the shift pedal 300 to be depressed halfway, or allows a half stroke operation of the shift pedal 300, to shift the stepless change speed device 86 from minimum speed to a half of the maximum speed when the backward/forward drive changeover device 95 is in a backward drive condition. The changeover slot portion 122 allows a free operation of the backward/forward drive changeover device 95 when the stepless change speed device 86 is in a minimum speed condition. The forward drive slot portion 121 and backward drive slot portion 123 are in the form of arcuate tracks around the axis 130, while the changeover slot portion 122 is a linear track directed toward the axis 130.

According to this interlocking structure, the engaging pin 153 lies in the forward drive slot portion 121 when the switch lever 201 is in a forward drive position, to enable a change speed operation from minimum speed to maximum speed with depression of the shift pedal 300. The engaging pin 153 lies in the backward drive slot portion 123 when the switch lever 201 is in a backward drive position, to enable a change speed operation from minimum speed to about a half of the maximum speed. The switch lever 201 is operable to effect a drive changeover operation only when the shift pedal 300 is released to place the stepless change speed device 86 in the minimum speed condition.

Figure 10:
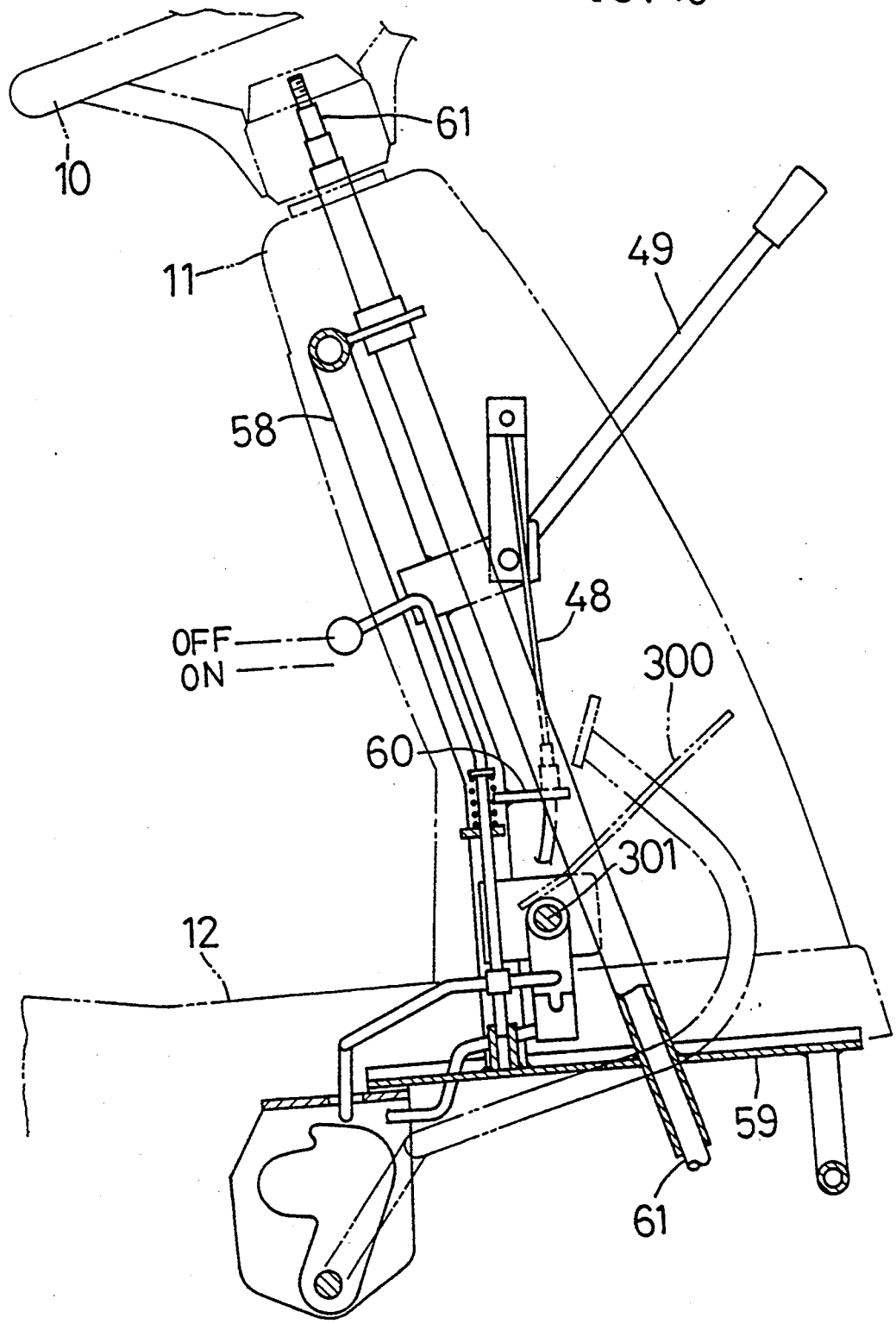
FIG. 10 is a side view showing an interior structure of a steering column.
Figure 11:
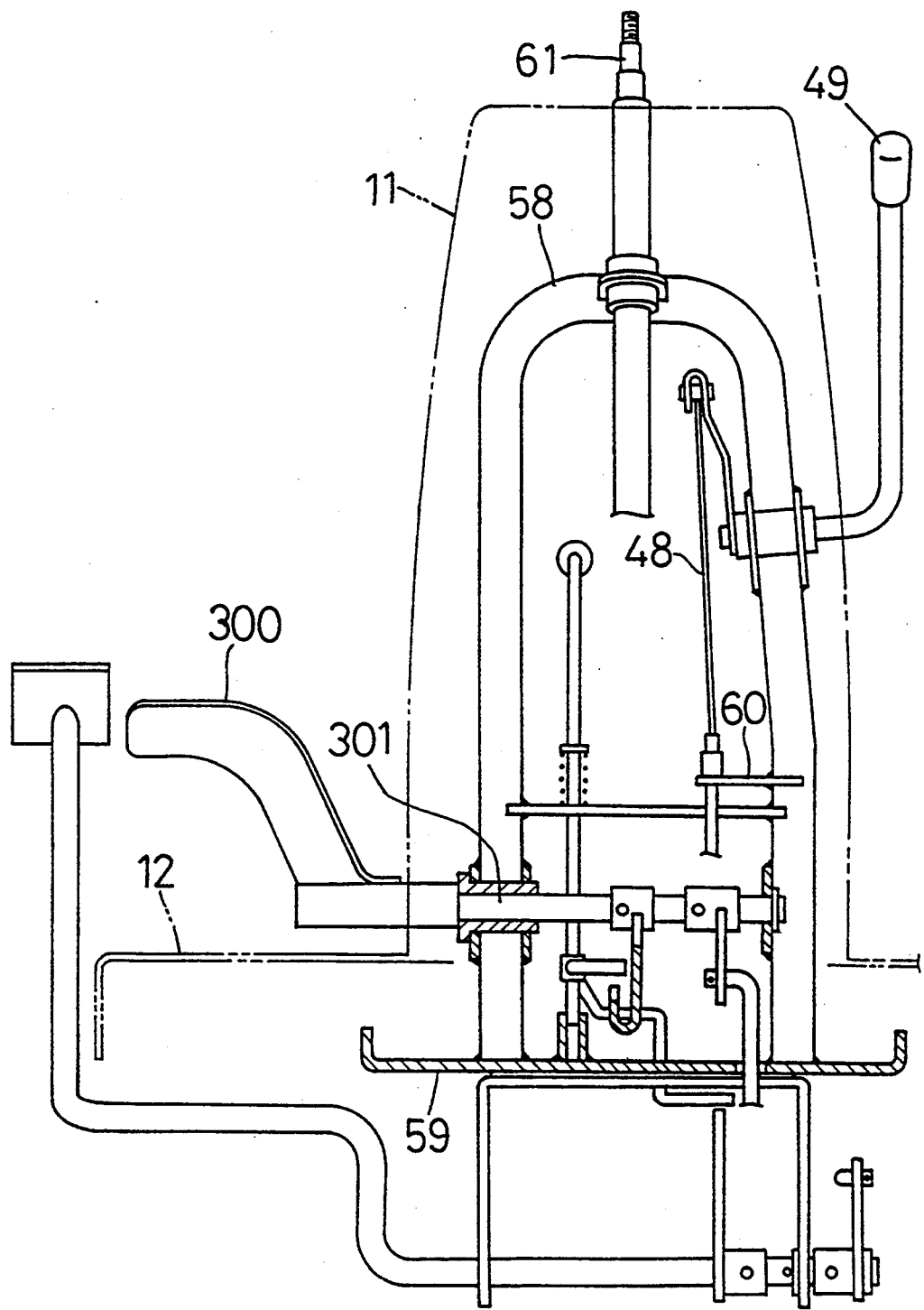
FIG. 11 is a front view showing the interior structure of the steering column.

Referring to FIGS. 10 and 11, an inverted U-shape frame 58 formed of pipe stock is secured to a steering base 59 fixed to the body frame 4. This frame 58 supports the PTO clutch lever 49 to which the control wire 48 is connected, a holder 60 for supporting the control wire 48, a pivotal axis 301 of the shift pedal 300, and a steering stem 61 extending from the steering wheel 10.

The features of the present invention will be summarized hereunder with reference to FIGS. 7 and 8.

The pivotable cam plate 151 is operatively connected to the change speed interlocking mechanism 100 extending between the shift pedal 300 and belt type stepless change speed device 86. The pivotable arm 152 is operatively connected to the changeover interlocking mechanism 200 extending between the switch lever 201 and backward/forward drive changeover device 95. The pin 153 of the arm 152 is fitted in the control slot 120 formed in the cam plate 151.

According to this structure, the engaging pin 153 lies in the arcuate forward drive slot portion 121 when the switch lever 201 is in the forward drive position. The forward drive slot portion 121 allows a full stroke depression of the shift pedal 300, whereby a forward speed may be selected between minimum speed and maximum speed. The engaging pin 153 lies in the arcuate backward drive slot portion 123 when the switch lever 201 is in the backward drive position. The backward drive slot portion 123 extends through a half angle of the forward drive slot portion 121 about the axis 130. Thus, the backward drive slot portion 123 allows a half stroke depression of the shift pedal 300, whereby a backward speed may be selected between minimum speed and a half of the maximum speed.

The forward drive slot portion 121 and backward drive slot portion 123 communicate with each other at minimum speed ends thereof through the changeover slot portion 122. Consequently, the switch lever 201 is operable to effect a backward/forward drive changeover operation only when the shift pedal 300 is released to establish a minimum speed condition.

The backward drive slot portion 123 may have a length corresponding to one third or two thirds of the forward drive slot portion 121. In other words, the length of the backward drive slot portion 123 may be selected to provide any speeds below the maximum speed.

The approximately J-shaped configuration of the control slot 120 may be varied so that the cam plate 151 is operatively connected to the changeover interlocking mechanism 200, and the arm 152 to the change speed interlocking mechanism 100.

The present invention may be applied to a transport or other working vehicle having a frictional stepless change speed device of the taper cone type (known as a CVT) for propelling the vehicle. The term "friction type stepless change speed device" used herein embraces the CVT as well as the belt type stepless change speed device.

What is claimed is:

1. A shift control system for a mower transmission having a backward/forward drive changeover device, a stepless change speed device, and a working said system comprising:

shift means for controlling said change speed device;
first interlock means for transmitting a shift of said shift means to said change speed device, said first interlock means including shift adjusting means for adjusting said shift transmitted from said shift means to said change speed device;
switch means for controlling said backward/forward drive changeover device; and
second interlock means for transmitting a shift of said switch means as an amount of control to said shift adjusting means;
wherein said shift adjusting means is operable, in response to a shift to a backward drive position of said switch means, to limit to a predetermined range said shift transmitted from said shift means to said change speed device.

2. A shift control system for a mower transmission having a backward/forward drive changeover device, a stepless change speed device, and a working unit, said shift control system comprising:

shift means for controlling said change speed device;
first interlock means for transmitting a shift of said shift means to said change speed device, said first interlock means including shift adjusting means for adjusting said shift transmitted from said shift means to said change speed device, said shift adjusting means having a first mode for allowing said shift to produce vehicle speeds ranging from a minimum speed to a maximum speed, and a second mode for allowing said shift to produce vehicle speeds limited to a range from said minimum speed to a predetermined speed below said maximum speed;
switch means for controlling said backward/forward drive changeover device; and
second interlock means for transmitting a shift of said switch means as an amount of control to said shift adjusting means;
wherein said shift adjusting means is set to said first mode in response to a shift to a forward drive position of said switch means, and to said second mode in response to a shift to a backward drive position of said switch means.

3. A shift control system as defined in claim 2, wherein said shift adjusting means additionally has a prohibit mode for prohibiting transmission of said shift from said shift means to said change speed device, said shift adjusting means being set to said prohibit mode in response to a shift to neutral of said switch means.

4. A shift control system as defined in claim 3, wherein said shift adjusting means includes a movable member comprising a pivotable plate member which is operatively connected to said shift means and to said change speed device, said movable member having a first guide, a second guide and a third guide formed along a direction of movement thereof, said first guide having a length corresponding to said shift of said shift means for producing vehicle speeds ranging from said minimum speed to said maximum speed, said second guide having a length corresponding to said shift of said shift means for producing vehicle speeds ranging from said minimum speed to said predetermined speed below said maximum speed, said third guide having a length for substantially prohibiting said shift, and wherein said second interlock means includes a guided member for engaging said first guide, said second guide and said third guide, said guided member being engageable with said first guide in response to the shift to said forward drive position of said switch means, with said second guide in response to the shift to said backward drive position of said switch means, and with said third guide in response to the shift to neutral of said switch means.

5. A shift control system for a vehicle transmission having a backward/forward drive changeover device and a stepless change speed device, said shift control system comprising;

shift means for controlling said change speed device;

first interlock means for transmitting a shift of said shift means to said change speed device, said first interlock means including shift adjusting means for adjusting said shift transmitted from said shift means to said change speed device, said shift adjusting means having a first mode for allowing said shift to produce vehicle speeds ranging from a minimum speed to a maximum speed, and a second mode for allowing said shift to produce vehicle speeds limited to a range from said minimum speed to a predetermined speed below said maximum speed;

switch means for controlling said backward/forward drive changeover device; and second interlock means for transmitting a shift of said switch means as an amount of control to said shift adjusting means;

wherein said shift adjusting means is set to said first mode in response to a shift to a forward drive position of said switch means, and to said second mode in response to a shift to a backward drive position of said switch means, wherein said shift adjusting means includes a movable member comprising a pivotable plate member which is operatively connected to said shift means and to said change speed device, said movable member having a first guide and a second guide formed along a direction of movement thereof, said first guide having a length corresponding to said shift of said shift means for producing vehicle speeds ranging from said minimum speed to said maximum speed, said second guide having a length corresponding to said shift of said shift means for producing vehicle speeds ranging from said minimum speed to said predetermined speed below said maximum speed, and wherein said second interlock means includes a guided member for engaging said first guide and said second guide, said guided member being engageable with said first guide in response to the shift to said forward drive position of said switch means, and with said second guide in response to the shift to said backward drive position of said switch means.

6. A shift control system for a vehicle transmission having a backward/forward drive changeover device and a stepless change speed device, said shift control system comprising:

shift means for controlling said change speed device;

first interlock means for transmitting a shift of said shift means to said change speed device, said first interlock means including shift adjusting means for adjusting said shift transmitted from said shift means to said change speed device, said shift adjusting means having a first mode for allowing said shift to produce vehicle speeds ranging from a minimum speed to a maximum speed, and a second mode for allowing said shift to produce vehicle speeds limited to a range from said minimum speed to a predetermined speed below said maximum speed;

switch means for controlling said backward/forward drive changeover device; and second interlock means for transmitting a shift of said switch means as an amount of control to said shift adjusting means;

wherein said shift adjusting means is set to said first mode in response to a shift to a forward drive position of said switch means, and to said second mode in response to a shift to a backward drive position of said switch means, wherein said shift adjusting means includes a movable member operatively connected to said shift means and to said change speed device, said movable member having a first guide and a second guide formed along a direction of movement thereof, said first guide having a length corresponding to said shift of said shift means for producing vehicle speeds ranging from said minimum speed to said maximum speed, said second guide having a length corresponding to said shift of said shift means for producing vehicle speed ranging from said minimum speed to said predetermined speed below said maximum speed, and wherein said second interlock means includes a guided member for engaging said first guide and said second guide, said guided member being engageable with said first guide in response to the shift to said forward drive position of said switch means, and with said second guide in response to the shift to said backward drive position of said switch means, wherein said movable member is in form of a pivotable plate, said first guide and said second guide being slots formed in said pivotable plate and having ends connected to each other, said guided member being in form of a pivotable arm having a pin attached to a free end thereof for engaging said slots.

7. A shift control system as defined in claim 6, wherein said stepless change speed device is a belt type stepless change speed device.

8. A shift control system as defined in claim 6, wherein said stepless change speed device is a taper cone type stepless change speed device.

* * * * *

UNITED STATES PATENT AND TRADEMARK OFFICE
CERTIFICATE OF CORRECTION

PATENT NO. : 5,410,923
DATED : May 2, 1995
INVENTOR(S) : Nobuyuki Yamashita, Ryozo Imanishi and Katsuhiko Uemura It is certified that error appears in the above-indentified patent and that said Letters Patent is hereby corrected as shown below:

Title page, under section [30] Foreign Application Priority Data, "Aug. 9, 1992" should read --Sept. 8, 1992--.

Column 1 Line 31 "devices. po When" should read --devices. When--.

Column 1 Line 40 "prior an" should read --prior art--.

Column 3 Line 67 "pan" should read --part--.

Claim 1 Line 66 Column 5 after "working" insert --unit,--.

Claim 5 Line 7 Column 7 "comprising;" should read --comprising:--.

Signed and Sealed this

Tenth Day of October, 1995

Attest:

BRUCE LEHMAN

*Attesting Officer*    *Commissioner of Patents and Trademarks*